US011698630B2

(12) United States Patent
Amano et al.

(10) Patent No.: US 11,698,630 B2
(45) Date of Patent: Jul. 11, 2023

(54) ABNORMALITY ANALYSIS DEVICE, ABNORMALITY ANALYSIS METHOD, AND MANUFACTURING SYSTEM

(71) Applicant: PANASONIC INTELLECTUAL PROPERTY MANAGEMENT CO., LTD., Osaka (JP)

(72) Inventors: Hiroshi Amano, Osaka (JP); Narumi Atsuta, Fukuoka (JP); Noriaki Hamada, Kanagawa (JP); Yosuke Tajika, Hyogo (JP); Nobutaka Kawaguchi, Osaka (JP); Yuichi Higuchi, Osaka (JP); Taichi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 327 days.

(21) Appl. No.: 16/973,917

(22) PCT Filed: Jun. 7, 2019

(86) PCT No.: PCT/JP2019/022667
§ 371 (c)(1),
(2) Date: Dec. 10, 2020

(87) PCT Pub. No.: WO2019/240019
PCT Pub. Date: Dec. 19, 2019

(65) Prior Publication Data
US 2021/0208578 A1 Jul. 8, 2021

(30) Foreign Application Priority Data
Jun. 11, 2018 (JP) .................. 2018-111048

(51) Int. Cl.
*G05B 23/02* (2006.01)
*G05B 19/418* (2006.01)

(52) U.S. Cl.
CPC ....... *G05B 23/0235* (2013.01); *G05B 19/418* (2013.01); *G05B 23/0272* (2013.01); *G05B 23/0281* (2013.01)

(58) Field of Classification Search
CPC ............ G05B 23/0205; G05B 23/0218; G05B 23/0227; G05B 23/0235; G05B 23/024;
(Continued)

(56) References Cited

U.S. PATENT DOCUMENTS 10,169,135 B1 * 1/2019 Pandey .............. G05B 23/0283
2011/0302131 A1 12/2011 Kawaba
(Continued)

FOREIGN PATENT DOCUMENTS

JP 2011-253355 A 12/2011
JP 2012-034273 A 2/2012

OTHER PUBLICATIONS

International Search Report and Written Opinion dated Sep. 3, 2019 in International Application No. PCT/JP2019/022667; with partial English translation.

*Primary Examiner* — Son T Le
*Assistant Examiner* — Matthew W. Baca
(74) *Attorney, Agent, or Firm* — McDermott Will & Emery LLP

(57) ABSTRACT

An abnormality analysis device including: an overall information obtainer that obtains overall information indicating an overall feature amount of a manufacturing system; an overall abnormal degree calculator that calculates an overall abnormal degree that is an abnormal degree of a whole of the manufacturing system by statistically processing the overall information; an individual information obtainer that obtains individual information indicating a feature amount of each of the plurality of constituent elements; an individual abnormal degree calculator that calculates an individual abnormal degree that is an abnormal degree of each of the plurality of constituent elements by statistically processing the individual information; and a determiner that determines
(Continued)

whether or not the overall abnormal degree exceeds a threshold value, wherein the individual abnormal degree calculator calculates the individual abnormal degree when the determiner determines that the overall abnormal degree exceeds the threshold value.

11 Claims, 6 Drawing Sheets

(58) Field of Classification Search
CPC ............ G05B 23/0275; G05B 23/0281; G05B 23/0283; G05B 23/0272; G05B 19/418; G05B 19/4185; G05B 2219/31244; G01M 99/00; G01M 99/005; H04L 63/1433; H04L 63/145; H04L 63/1425; Y02P 90/02

See application file for complete search history.

(56) References Cited

U.S. PATENT DOCUMENTS

| | | |
|---|---|---|
| 2012/0030761 A1 | 2/2012 | Baba et al. |
| 2015/0085675 A1* | 3/2015 | Pei .................... H04L 41/0677 370/242 |

* cited by examiner

FIG. 4
(a)
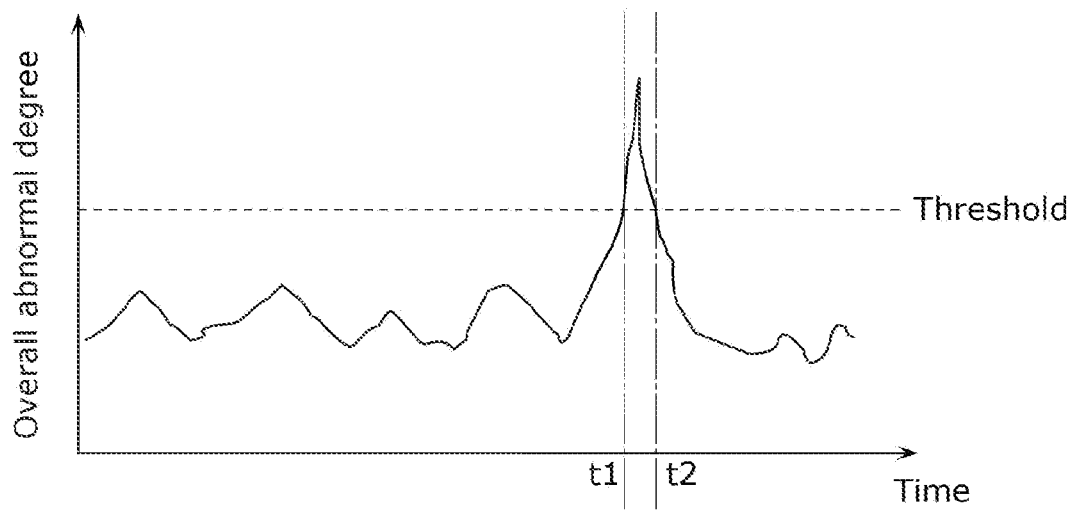
(b)
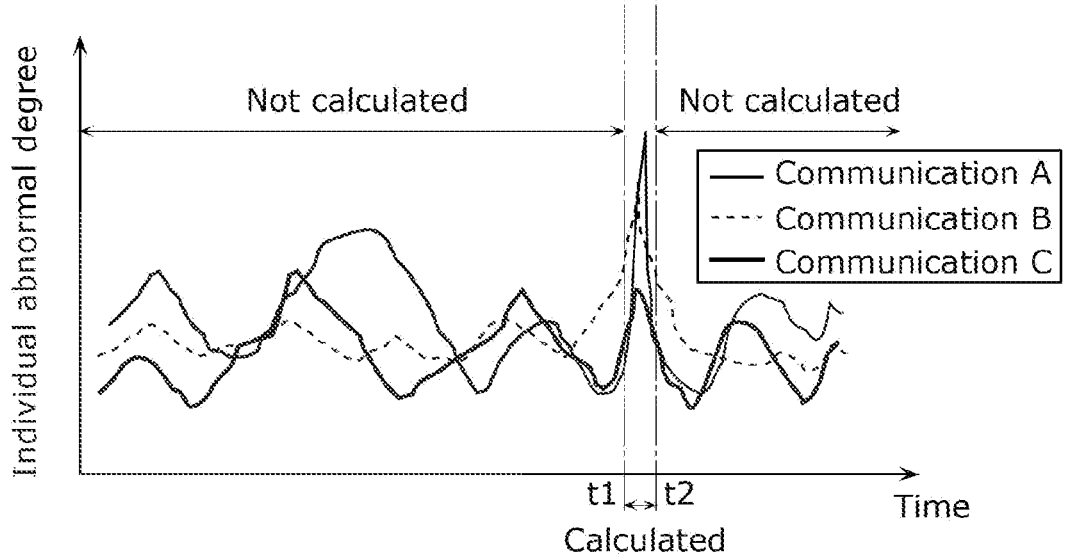

ABNORMALITY ANALYSIS DEVICE, ABNORMALITY ANALYSIS METHOD, AND MANUFACTURING SYSTEM

CROSS-REFERENCE OF RELATED APPLICATIONS

This application is the U.S. National Phase under 35 U.S.C. § 371 of International Patent Application No. PCT/JP2019/022667, filed on Jun. 7, 2019, which in turn claims the benefit of Japanese Application No. 2018-111048, filed on Jun. 11, 2018, the entire disclosures of which Applications are incorporated by reference herein.

TECHNICAL FIELD

The present invention relates to an abnormality analysis device, an abnormality analysis method, and a manufacturing system.

BACKGROUND ART

In recent years, communication between a plurality of manufacturing devices has been carried out at manufacturing sites such as factories. Therefore, it is required to improve the security of communication.

For example, Patent Literature (PTL) 1 discloses a communication analysis device for detecting an unauthorized access. The analysis device described in PTL 1 extracts a plurality of sequence candidates for an unauthorized access made between a plurality of information processing devices, and calculates an evaluation value indicating the probability that each sequence candidate is an unauthorized access based on the normality of transactions that can be restored by the second communication history obtained by excluding the first communication history corresponding to each extracted sequence candidate.

CITATION LIST

Patent Literature

[PTL 1] Japanese Unexamined Patent Application Publication No. 2011-253355

SUMMARY OF INVENTION

Technical Problem

However, when the above-mentioned conventional analysis device is used in the manufacturing system, no unauthorized access may be detected accurately. For example, when there are a plurality of unauthorized accesses in the sequence candidates, even if the sequence candidates that are unauthorized accesses are extracted, there are sequence candidates corresponding to the unauthorized accesses in addition to the extracted sequence candidates. Thus, the transaction that can be restored by the second communication history does not become normal. Therefore, it cannot be determined whether the extracted sequence candidate is an unauthorized access.

Therefore, the present disclosure provides an abnormality analysis device, an abnormality analysis method, and a manufacturing system that can accurately detect an abnormality in a manufacturing system with a small amount of calculation.

Solution to Problem

In order to solve the above problem, the abnormality analysis device according to one aspect of the present disclosure is an abnormality analysis device that analyzes an abnormality in a manufacturing system that manufactures products by operating a plurality of constituent elements, the abnormality analysis device including: an overall information obtainer that obtains overall information indicating an overall feature amount of the manufacturing system; an overall abnormal degree calculator that calculates an overall abnormal degree that is an abnormal degree of a whole of the manufacturing system by statistically processing the overall information; an individual information obtainer that obtains individual information indicating a feature amount of each of the plurality of constituent elements; an individual abnormal degree calculator that calculates an individual abnormal degree that is an abnormal degree of each of the plurality of constituent elements by statistically processing the individual information; and a determiner that determines whether the overall abnormal degree exceeds a threshold value, wherein the individual abnormal degree calculator calculates the individual abnormal degree when the determiner determines that the overall abnormal degree exceeds the threshold value.

In addition, the manufacturing system according to one aspect of the present disclosure is a manufacturing system that manufactures products by operating a plurality of constituent dements, and includes the above abnormality analysis device.

In addition, the abnormality analysis method according to one aspect of the present disclosure is an abnormality analysis method that analyzes abnormality in a manufacturing system that manufactures products by operating a plurality of constituent elements, the abnormality analysis method including: obtaining overall information indicating an overall feature amount of the manufacturing system; calculating overall abnormal degree that is an abnormal degree of a whole of the manufacturing system by statistically processing the overall information; obtaining individual information indicating a feature amount of each of the plurality of constituent dements; calculating individual abnormal degree that is an abnormal degree of each of the plurality of constituent dements by statistically processing the individual information; determining whether the overall abnormality level exceeds a threshold value; and calculating the individual abnormal degree in the calculating individual abnormal degree, when the overall abnormality level is determined to exceed the threshold value.

In addition, one aspect of the present disclosure can be realized as a program for causing a computer to execute the above abnormality analysis method. Alternatively, it can also be realized as a computer-readable recording medium in which the program is stored.

Advantageous Effects of Invention

According to the present disclosure, it is possible to accurately detect an abnormality in a manufacturing system with a small amount of calculation.

BRIEF DESCRIPTION OF DRAWINGS

FIG. 4 is a diagram showing an example of an overall abnormal degree and an individual abnormal degree calculated by the abnormality analysis device according to the embodiment.

DESCRIPTION OF EMBODIMENTS

Summary of the Present Disclosure

Figure 1:
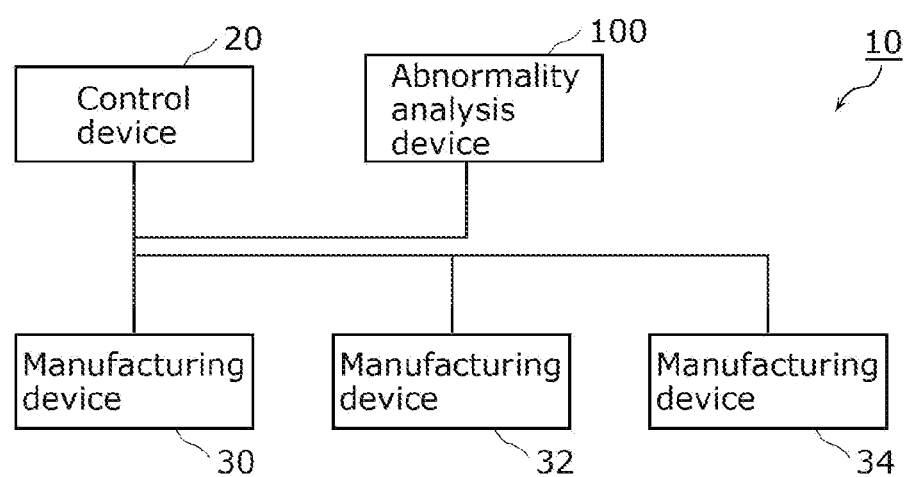
FIG. 1 is a block diagram showing a configuration of a manufacturing system according to an embodiment.

As described above, at a manufacturing site such as a factory, a plurality of manufacturing devices communicate with each other to manufacture products in cooperation with each other. For this reason, when a malicious attack or the like is received from the outside on the communication, the load on each manufacturing device may increase or the manufacturing device may fail, so that there is such a risk that the productivity of the products decreases. Therefore, it is required to enhance the security of communication via the internal network of the manufacturing system. For example, it is required to take measures such as preventing unauthorized access to the internal network.

Specifically, measures to introduce a firewall at the entrance to the internal network can be considered. This makes it possible to suppress malicious connections from the outside. However, for example, when a security threat, that is, a vulnerability is discovered in a firewall, it is not possible to respond to an attack (so-called zero-day attack) before the vulnerability is addressed.

In addition, even if the firewall is functioning normally, it is not possible to prevent unauthorized operation from the inside due to human factors such as the operator or administrator of the manufacturing devices. For example, when a computer device or memory device infected with a virus is connected to an internal network, the infection spreads to each manufacturing device regardless of the malicious intent of the operator.

In this way, dealing with unauthorized access at the entrance to the internal network is not perfect.

In addition, by installing security software for each of a plurality of manufacturing devices, it is possible to take measures to detect unauthorized processing for each manufacturing device. However, since there are a wide variety of manufacturing devices, it is not always possible to install security software in all manufacturing devices. If there is even one manufacturing device for which no countermeasures have been taken, there is a possibility that unauthorized access or the like may be performed through the manufacturing device.

As described above, it is difficult to improve the communication security for the manufacturing system, and when an abnormality occurs in the manufacturing system, it is desired to detect the abnormality with high accuracy.

Therefore, in order to solve the above problems, the abnormality analysis device according to one aspect of the present disclosure is an abnormality analysis device that analyzes an abnormality in a manufacturing system that manufactures products by operating a plurality of constituent elements, the abnormality analysis device including: an overall information obtainer that obtains overall information indicating an overall feature amount of the manufacturing system; an overall abnormal degree calculator that calculates an overall abnormal degree that is an abnormal degree of a whole of the manufacturing system by statistically processing the overall information; an individual information obtainer that obtains individual information indicating a feature amount of each of the plurality of constituent elements; an individual abnormal degree calculator that calculates an individual abnormal degree that is an abnormal degree of each of the plurality of constituent elements by statistically processing the individual information; and a determiner that determines whether the overall abnormal degree exceeds a threshold value, wherein the individual abnormal degree calculator calculates the individual abnormal degree when the determiner determines that the overall abnormal degree exceeds the threshold value.

With this, when the overall abnormal degree is determined to exceed threshold value, the individual abnormal degree is calculated, so that for example, when it is not determined that the overall abnormal degree exceeds threshold value, the individual abnormal degree does not have to be calculated, and the amount of calculation can be reduced. In addition, when the overall abnormal degree is determined to exceed threshold value, the individual abnormal degree of each of the plurality of constituent elements is calculated, so that the abnormal constituent element among the plurality of constituent elements can be easily decided. Even when a plurality of abnormal constituent elements are present, the individual abnormal degree of each of the plurality of constituent elements is calculated, so that the plurality of abnormal constituent elements can be decided. In this way, according to the present aspect, it is possible to accurately detect an abnormality in the manufacturing system with a small amount of calculation.

In addition, for example, the abnormality analysis device according to one aspect of the present disclosure may further include a decider that decides a constituent element corresponding to a maximum individual abnormal degree as an abnormal constituent element among a plurality of individual abnormal degrees calculated by the individual abnormal degree calculator.

It is difficult to accurately set a threshold value for each constituent element, and it is difficult to accurately determine whether each constituent element is abnormal. On the other hand, since the relative comparison of the plurality of individual abnormal degrees is performed in the present aspect, a threshold value for determining whether the abnormality is present for each of the plurality of constituent elements is not required. In the present aspect, it can be seen that at least one of the plurality of constituent elements is an abnormal constituent element by the overall abnormal degree exceeding the threshold value. Then, the constituent element corresponding to the maximum individual abnormal degree among the plurality of constituent elements is decided as the abnormal constituent element, so that the abnormal constituent element can be decided with high accuracy. In addition, it is not necessary to secure a memory area for storing the threshold value, and the memory resource can be effectively used.

In addition, for example, the overall abnormal degree calculator may further calculate a partial abnormal degree that is an abnormal degree of a partial system obtained by excluding the abnormal constituent element from the manufacturing system by statistically processing partial information obtained by excluding feature amounts of the abnormal constituent element from the overall information, when the overall abnormal degree is determined to exceed threshold value, the determiner further determines whether the partial abnormal degree exceeds the threshold value, and the decider may further decide, as the abnormal constituent element, a constituent element corresponding to the maximum individual abnormal degree among remaining individual abnormal degrees obtained by excluding an individual abnormal degree corresponding to the abnormal constituent element from the plurality of abnormal degrees, when the partial abnormal degree is determined to exceed the threshold value.

This makes it possible to easily decide two abnormal constituent elements without requiring a threshold value or the like.

In addition, for example, the overall abnormal degree calculator and the determiner may repeat a calculation of the partial abnormal degree and a decision of the abnormal constituent element until the determiner does not determine that the partial abnormal degree exceeds the threshold value.

This makes it possible to easily decide all the abnormal constituent elements included in the plurality of constituent elements.

In addition, for example, the abnormality analysis device according to one aspect of the present disclosure may further include an outputter that outputs information for specifying the abnormal constituent element.

With this, the abnormal constituent element can be easily specified by using the output information. Thus, for example, maintenance work such as repair and replacement of abnormal constituent elements can be performed promptly, so that the period required for maintenance can be shortened and production efficiency can be improved.

In addition, for example, the overall abnormal degree calculator calculates the overall abnormal degree every predetermined period, the determiner determines whether the overall abnormal degree for the every predetermined period exceeds threshold value, the individual abnormal degree calculator calculates the individual abnormal degree only in a period when the determiner determines that the overall abnormal degree exceeds the threshold value, and it may not calculate the individual abnormal degree in a period when the determiner does not determine that the overall abnormal degree exceeds the threshold value.

With this, the individual abnormal degree in the period when the overall abnormal degree is not determined to exceed the threshold value is not calculated, so that the amount of calculation can be sufficiently reduced.

In addition, for example, the manufacturing system may include: one or more manufacturing devices that manufacture the products; and a control device that communicates with and controls the one or more manufacturing devices, and one of the plurality of constituent elements may be communication between one of the one or more manufacturing devices and the control device.

This makes it possible to accurately detect communication abnormalities such as unauthorized access.

In addition, for example, the manufacturing system may include one or more manufacturing devices that manufacture the products, and at least one of the plurality of constituent elements may be the one or more manufacturing devices.

This makes it possible to accurately detect abnormalities in the manufacturing device such as failures.

In addition, for example, the manufacturing system according to one aspect of the present disclosure is a manufacturing system that manufactures products by operating a plurality of constituent elements, and includes the abnormality analysis device described above.

With this, as with the abnormality analysis device described above, it is possible to accurately detect an abnormality with a small amount of calculation, so that maintenance or the like for the detected abnormality can be performed promptly, Therefore, a highly productive manufacturing system can be realized.

In addition, for example, the abnormality analysis method according to one aspect of the present disclosure is an abnormality analysis method that analyzes abnormality in a manufacturing system that manufactures products by operating a plurality of constituent elements, the abnormality analysis method including: obtaining overall information indicating an overall feature amount of the manufacturing system; calculating overall abnormal degree that is an abnormal degree of a whole of the manufacturing system by statistically processing the overall information; obtaining individual information indicating a feature amount of each of the plurality of constituent elements; calculating individual abnormal degree that is an abnormal degree of each of the plurality of constituent elements by statistically processing the individual information; determining whether the overall abnormality level exceeds a threshold value; and calculating the individual abnormal degree in the calculating individual abnormal degree, when the overall abnormality level is determined to exceed the threshold value. In addition, for example, the program according to one aspect of the present disclosure is a program for causing a computer to execute the above abnormality analysis method.

With this, as with the abnormality analysis device described above, it is possible to accurately detect an abnormality in the manufacturing system with a small amount of calculation.

Hereinafter, the embodiments will be specifically described with reference to the drawings.

It should be noted that all of the embodiments described below are comprehensive or specific examples. Numerical values, shapes, materials, constituent elements, arrangement positions and connection forms of constituent elements, steps, order of steps, and the like shown in the following embodiments are merely examples, and are not intended to limit the present disclosure. In addition, among the constituent elements in the following embodiments, the constituent elements not described in the independent claims will be described as arbitrary constituent elements.

In addition, each figure is a schematic view and is not necessarily exactly illustrated. Therefore, for example, the scales and the like do not always match in each figure. In addition, in each figure, substantially the same configuration is designated by the same reference numerals, and duplicate description will be omitted or simplified.

Embodiment

First, the outline of the manufacturing system according to the embodiment will be described with reference to FIG. 1, FIG. 1 is a block diagram showing a configuration of manufacturing system 10 according to the present embodiment.

As shown in FIG. 1, manufacturing system 10 includes control device 20, manufacturing devices 30, 32 and 34, and abnormality analysis device 100, Control device 20 and each of manufacturing devices 30, 32, and 34 are communicably connected via a network.

In the present embodiment, manufacturing system 10 manufactures products by operating a plurality of constituent elements. A constituent element is an element related to the manufacture of the products and is an element in which an abnormality may occur. Each of the plurality of constituent elements is an abnormality detection target by abnormality analysis device 100.

For example, the plurality of constituent elements include communication between devices. Specifically, the communication between control device 20 and each of manufacturing devices 30, 32, and 34, and the communication between the manufacturing devices such as the communication between manufacturing device 30 and manufacturing device 32 are constituent elements of manufacturing system 10, respectively. In addition, the plurality of constituent elements may include control device 20 and each of manufacturing devices 30, 32, and 34. It should be noted that the plurality of constituent elements may be internal parts (for example, a suction nozzle, a feeder, and the like) of one manufacturing device.

Control device 20 controls manufacturing devices 30, 32, and 34. Control device 20 is realized by, for example, a computer device and the like. Control device 20 is realized by a non-volatile memory in which a program is stored, a volatile memory which is a transitory storage area for executing a program, an input output port, a processor for executing a program, and the like. Each function of control device 20 may be realized by software executed by a processor, or may be realized by hardware such as an electronic circuit including a plurality of circuit components.

Manufacturing devices 30, 32 and 34 manufacture products. For example, manufacturing devices 30, 32, and 34 are arranged side by side along the manufacturing line. Manufacturing devices 30, 32 and 34 perform, for example, steps for manufacturing one product which are different from one another. Manufacturing devices 30, 32, and 34 are, for example, constituent element mounting machines, respectively. Alternatively, at least one of manufacturing devices 30, 32, or 34 may be a substrate transfer device, a constituent element supply device, or the like.

It should be noted that the configuration of manufacturing system 10 is not limited to the example shown in FIG. 1, For example, although an example in which the number of manufacturing devices included in manufacturing system 10 is three is shown in FIG. 1, the number may be only one, two, or four or more. In addition, manufacturing system 10 does not have to include control device 20, and the plurality of manufacturing devices 30, 32, and 34 may cooperate with each other to manufacture products by communicating with each other.

Abnormality analysis device 100 analyzes abnormalities of manufacturing system 10. Abnormality analysis device 100 is realized by, for example, a computer device and the like. Abnormality analysis device 100 is realized by a non-volatile memory in which a program is stored, a volatile memory which is a transitory storage area for executing a program, an input/output port, a processor for executing a program, and the like. Each function of abnormality analysis device 100 may be realized by software executed by a processor, or may be realized by hardware such as an electronic circuit including a plurality of circuit components.

Figure 2:
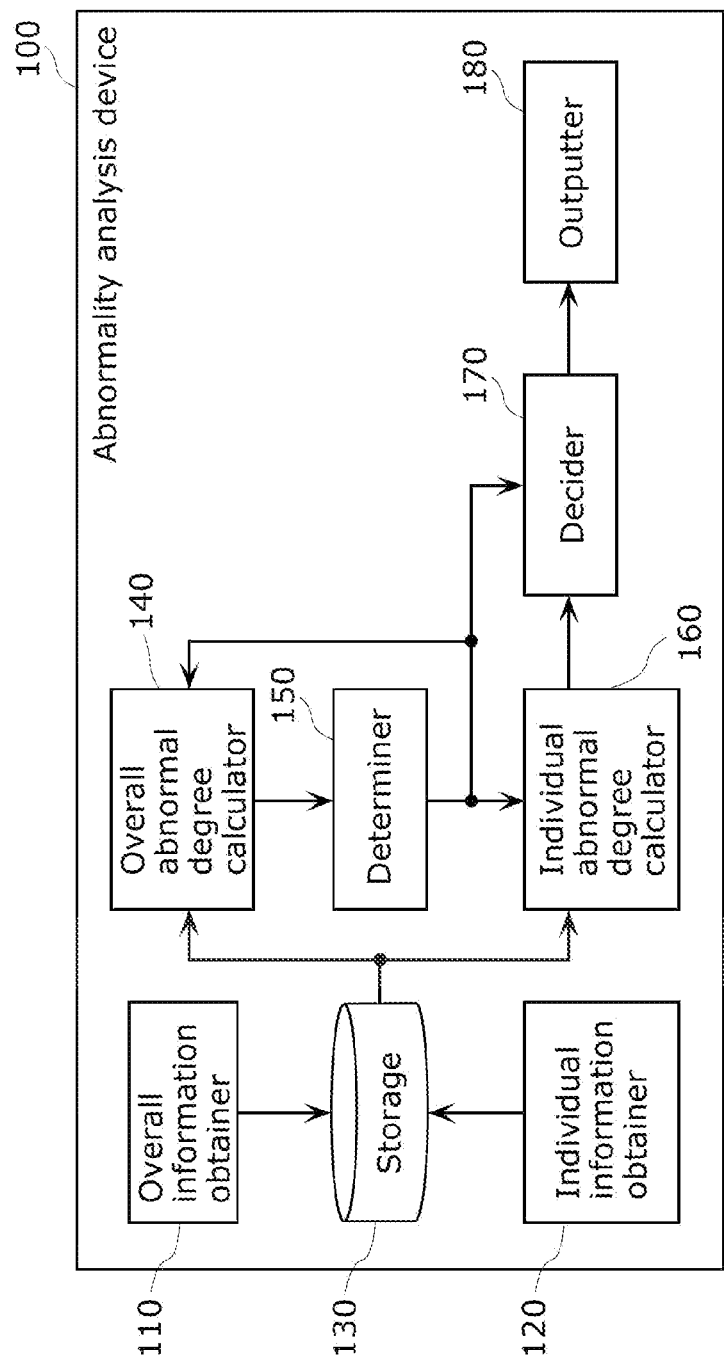
FIG. 2 is a block diagram showing a configuration of an abnormality analysis device according to the embodiment.

FIG. 2 is a block diagram showing the configuration of abnormality analysis device 100 according to the present embodiment. As shown in FIG. 2, abnormality analysis device 100 includes overall information obtainer 110, individual information obtainer 120, storage 130, overall abnormal degree calculator 140, determiner 150, individual abnormal degree calculator 160, decider 170, and outputter 180.

Overall information obtainer 110 obtains overall information indicating an overall feature amount of manufacturing system 10. The overall information corresponds to the overall operation information of manufacturing system 10. Specifically, the feature amounts indicated by the overall information are physical quantities whose values are different from those in the normal state when an abnormality such as a failure occurs. The feature amounts are, for example, at least one of the overall manufacturing time, the number of errors, the number of production, or the amount of power consumption of manufacturing system 10. The overall manufacturing time of manufacturing system 10 is the time when the overall manufacturing system 10 is operated, that is, the time when at least one of the constituent elements of manufacturing system 10 is operated. The overall number of errors in manufacturing system 10 is the overall number of errors that occurred during the operation of manufacturing system 10. The overall number of production produced in manufacturing system 10 is the overall number of products manufactured during the operation of manufacturing system 10. The overall power consumption of manufacturing system 10 is the amount of power consumed during the operation of manufacturing system 10.

The overall information indicates, for example, the feature amounts for each predetermined period, That is, the overall information indicates at least one of the manufacturing time, the number of errors, the number of production, or the power consumption for each predetermined period. The predetermined period is a unit for calculating the abnormal degree, such as one second, but is not limited thereto.

The overall information may be information related to the communication of the overall internal network of manufacturing system 10. For example, the feature amounts indicated by the overall information is a physical quantity whose value is different from that in the normal state when an abnormality such as unauthorized access occurs. The feature amounts may be, for example, at least one of the overall number of packets, the maximum size of the packets, or the maximum value or the average value of the arrival intervals of the packets in manufacturing system 10.

Individual information obtainer 120 obtains individual information indicating a feature amount of each of the plurality of constituent elements of manufacturing system 10. The individual information corresponds to the operation information of each constituent element. Specifically, the individual information indicates the same feature amounts as the overall information. For example, the feature amounts indicated by the individual information are at least one of the manufacturing time, the number of errors, the number of production, or the amount of power consumption in which the corresponding constituent element is involved. The constituent element here is any one of control device 20 and manufacturing devices 30, 32, and 34. For example, the individual information corresponding to manufacturing device 30 indicates any one of the time during which manufacturing device 30 operates (that is, the manufacturing time), the number of errors (error count) generated by the operation of manufacturing device 30, the number of products (production number) manufactured by the operation of manufacturing device 30, and the amount of power (the amount of power consumption) consumed by manufacturing device 30 in each predetermined period. Alternatively, when the constituent element is communication, the feature amounts indicated by the individual Information may be at least one of the number of packets, the maximum size of the packets, or the maximum value or the average value of the arrival intervals of the packets in the corresponding communication.

Overall information obtainer 110 and individual information obtainer 120 obtain overall information and individual information that indicate feature amounts such as a manufacturing time, for example, by obtaining manufacturing log information from each of control device 20 and manufacturing devices 30, 32, and 34. The manufacturing log information is, for example, information indicating a time and an operation performed at that time. In addition, overall information obtainer 110 and individual information obtainer 120 may obtain overall information and individual information indicating feature amounts such as the number of packets, for example, by mirroring and receiving communication between each device.

Storage 130 is a memory for storing the overall information and individual information of each of the plurality of constituent elements, Storage 130 is realized by a non-volatile storage such as an HDD (Hard Disk Drive), a semiconductor memory or the like. In storage 130, the overall information and the plurality of individual information are stored in association with the time information, respectively.

Overall abnormal degree calculator 140 calculates the overall abnormal degree that is the abnormal degree of a whole of manufacturing system 10 by statistically processing the overall information. Specifically, overall abnormal degree calculator 140 calculates the overall abnormal degree every predetermined period. As described above, the predetermined period is, for example, one second.

The abnormal degree is an index indicating the degree of an abnormal state in which products cannot be manufactured normally due to the occurrence of a device failure, unauthorized access to communication, or the like, Specifically, the abnormal degree is an outlier from a normal model representing a state in which products can be manufactured normally. For example, the higher the abnormal degree, the lower the production efficiency of the products or the higher the energy intensity. The lower the abnormal degree, the higher the production efficiency of the products and the lower the energy intensity.

Specifically, overall abnormal degree calculator 140 creates an overall normal model representing the case where the overall operation of manufacturing system 10 is normal. For example, overall abnormal degree calculator 140 creates an overall normal model by statistically processing the feature amounts in the period in which manufacturing system 10 is operating in the normal state. Overall abnormal degree calculator 140 calculates the overall abnormal degree as an outlier from the created overall normal model. The algorithm for creating the overall normal model and calculating the overall abnormal degree is, for example, the Local Outlier Factor (LOF) method, the Support Vector Machine (SVM) method, the k-Nearest Neighbor (kNN) method, and the like.

In addition, when determiner 150 determines that the overall abnormal degree exceeds threshold value Th, overall abnormal degree calculator 140 calculates a partial abnormal degree that is an abnormal degree of the partial system obtained by excluding abnormal constituent elements from manufacturing system 10 by statistically processing the partial information obtained by excluding the feature amounts of the abnormal constituent element from the overall information. The partial information is information indicating the overall feature amount of the partial system obtained by excluding the abnormal constituent elements from overall manufacturing system 10. The partial abnormal degree is the overall abnormal degree of the partial system. In the present embodiment, overall abnormal degree calculator 140 repeats the calculation of the partial abnormal degree until determiner 150 does not determine that the partial abnormal degree exceeds threshold value Th.

The abnormal constituent element is a constituent element corresponding to the maximum individual abnormal degree among the plurality of constituent elements of manufacturing system 10. When determiner 150 determines that the overall abnormal degree exceeds threshold value Th, overall abnormal degree calculator 140 creates a partial normal model for the partial system, and calculates the partial abnormal degree as an outlier from the created partial normal model. The algorithm for calculating the partial abnormal degree is, for example, the same algorithm as for calculating the overall abnormal degree, but may be a different algorithm.

Determiner 150 determines whether the overall abnormal degree exceeds threshold value Th. Specifically, determiner 150 determines whether the overall abnormal degree for each predetermined period exceeds threshold value Th. Furthermore, when the partial abnormal degree is calculated, determiner 150 determines whether the partial abnormal degree exceeds threshold value Th. Here, threshold value Th is a fixed value decided at the time of creating the overall normal model, but may be updated every time the overall normal model or the partial normal model is created. That is, threshold value Th used for comparing the overall abnormal degree and threshold value Th used for comparing the partial abnormal degree are the same value, but may be different values.

Individual abnormal degree calculator 160 calculates the individual abnormal degree which is the abnormal degree of each of the plurality of constituent elements by statistically processing the individual information. Individual abnormal degree calculator 160 calculates the individual abnormal degree when determiner 150 determines that the overall abnormal degree exceeds threshold value Th. Specifically, individual abnormal degree calculator 160 calculates the individual abnormal degree only in the period when determiner 150 determines that the overall abnormal degree exceeds threshold value Th, and does not calculate the individual abnormal degree in the period when determiner 150 does not determine that the overall abnormal degree exceeds threshold value Th.

More specifically, individual abnormal degree calculator 160 creates an individual normal model representing the case where the operation of the corresponding constituent element is normal for each constituent element. For example, individual abnormal degree calculator 160 creates an individual normal model by statistically processing the feature amounts of the period during which the corresponding constituent element is operating in the normal state for each constituent element. Individual abnormal degree calculator 160 calculates the individual abnormal degree as an outlier from the created individual normal model. The algorithm for creating the individual normal model and calculating the individual abnormal degree is, for example, the LOF method, the SVM method, the kNN method, or the like.

Decider 170 decides, as the abnormal constituent element, the constituent element corresponding to the maximum individual abnormal degree among the plurality of individual abnormal degrees calculated by individual abnormal degree calculator 160. Decider 170 further decides, as the abnormal constituent element, the constituent element corresponding to the maximum individual abnormal degree among the remaining individual abnormal degrees obtained by excluding the individual abnormal degree corresponding to the abnormal constituent element from the plurality of individual abnormal degrees when the partial abnormal degree is determined to exceed threshold value Th. That is, when the partial abnormal degree is determined to exceed threshold value Th, decider 170 decides the constituent element having the second highest individual abnormal degree as the second abnormal constituent element as a whole.

Decider 170 repeats the decision of the abnormal constituent element until determiner 150 does not determine that the partial abnormal degree exceeds threshold value Th. Every time the partial abnormal degree exceeds threshold value Th, the constituent elements are excluded from the partial system to be calculated, so that if all the remaining constituent elements not excluded are normal, the partial abnormal degree is smaller than threshold value Th. With this, all the abnormal constituent elements included in the overall manufacturing system 10 can be decided.

Outputter 180 outputs information for specifying an abnormal constituent element. Outputter 180 includes, for example, at least one of a display that displays an image, an audio outputter that outputs audio, or a data outputter that outputs data. The display is realized by, for example, a liquid crystal display device or the like. The audio outputter is realized by, for example, a speaker or the like. The data outputter is realized by, for example, a communication interface or the like that performs wireless communication or wired communication. The data outputter outputs information for specifying an abnormal constituent element to an external server device such as a management server of a manager of manufacturing system 10 or a person who performs maintenance, for example, by performing wireless communication.

When the abnormal constituent element is a device, the information for specifying the abnormal constituent element is, for example, the name or installation position of the device. In addition, when the abnormal constituent element is communication, the information for specifying the abnormal constituent element is, for example, the names or installation positions of two or more devices performing the communication.

Subsequently, the abnormality analysis process by abnormality analysis device 100 according to the present embodiment will be described with reference to FIG. 3 to FIG. 6.

Figure 3:
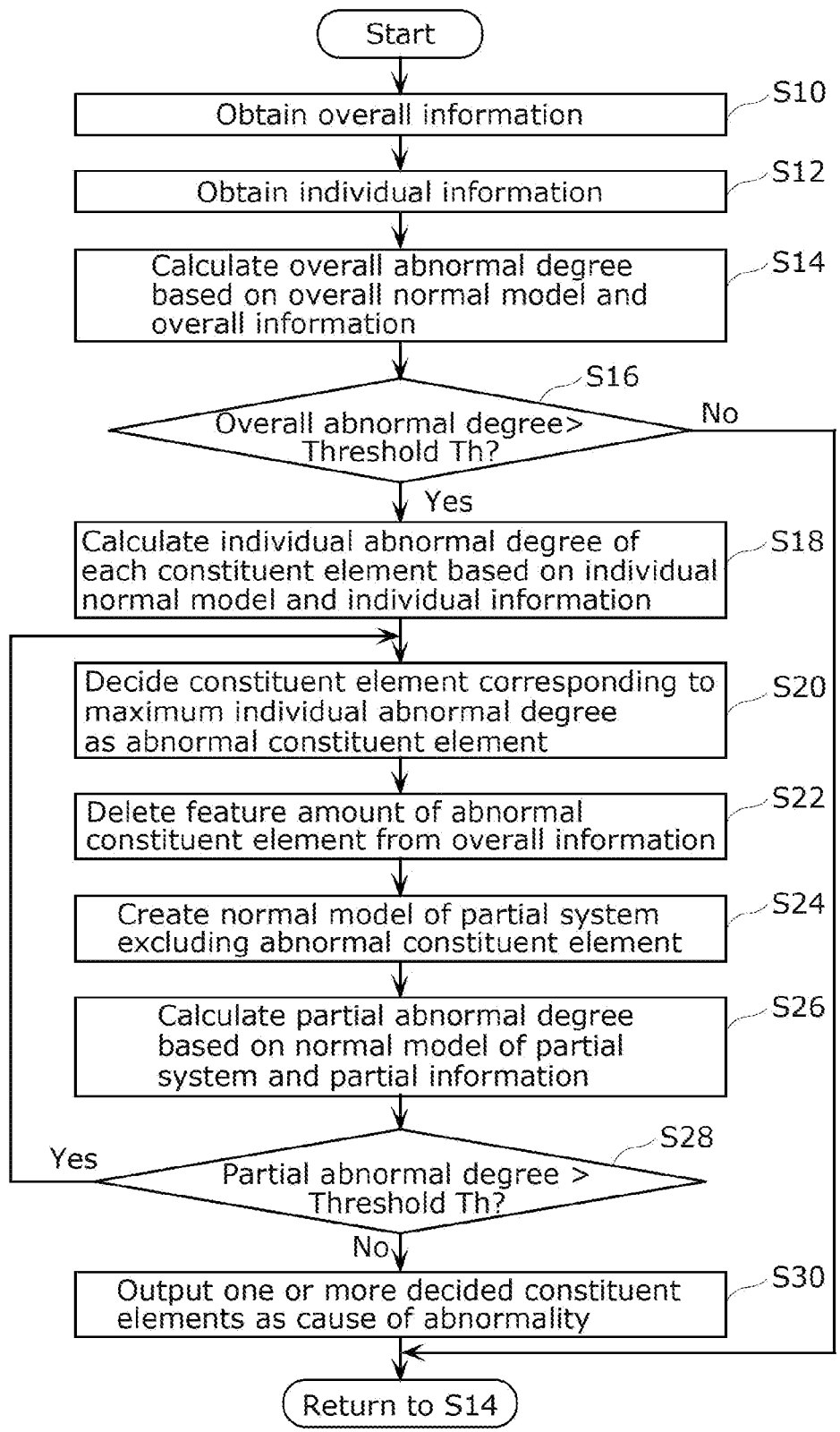
FIG. 3 is a flowchart showing an abnormality analysis process performed by the abnormality analysis device according to the embodiment.

FIG. 3 is a flowchart showing an abnormality analysis process performed by abnormality analysis device 100 according to the present embodiment. The abnormality analysis process shown in FIG. 3 is executed, for example, for each predetermined manufacturing unit. The manufacturing unit is, for example, a lot, or a time such as one hour or one day. Alternatively, the abnormality analysis process may be executed in substantially real time according to the manufacturing operation of manufacturing system 10.

It should be noted that abnormality analysis device 100 creates a normal model in advance as a preliminary process. Specifically, overall abnormal degree calculator 140 creates a normal model of all (overall normal model) of manufacturing system 10. Individual abnormal degree calculator 160 creates a normal model on an individual basis (individual normal model) for each of the plurality of constituent elements. The creation of the normal model is performed, for example, by using the data confirmed that manufacturing system 10 and each constituent element are operating normally.

As shown in FIG. 3, first, overall information obtainer 110 obtains overall information (S10). Next, individual information obtainer 120 obtains individual information of each of the plurality of constituent elements (S12). For example, overall information obtainer 110 and individual information obtainer 120 obtain overall information and individual information for a predetermined manufacturing unit (for example, one day) to be analyzed for an abnormality. It should be noted that overall information obtainer 110 and individual information obtainer 120 may obtain the overall information and individual information for a predetermined period (for example, one second), which is a unit for calculating the abnormal degree.

In addition, obtaining overall information and obtaining individual information may be performed at the same time. Alternatively, overall information obtainer 110 may obtain overall information based on the plurality of individual information obtained by individual information obtainer 120. In addition, obtaining the individual information may be performed after it is determined in step S16 described later that the overall abnormal degree exceeds threshold value Th, and before the calculation of the individual abnormal degree is performed.

Next, overall abnormal degree calculator 140 calculates the overall abnormal degree based on the overall normal model of manufacturing system 10 and the overall information (S14). Specifically, overall abnormal degree calculator 140 calculates the overall abnormal degree for a predetermined period. After the overall abnormal degree is calculated, determiner 150 compares the calculated overall abnormal degree with threshold value Th (S16).

When the overall abnormal degree is determined to be equal to or less than threshold value Th (No in S16), the process returns to step S14, and the overall abnormal degree for the next period is calculated. It should be noted that when the overall information and individual information obtained in steps S10 and S12 are information for a predetermined period, the process returns to step S10 and repeats from obtaining the overall information for the next period.

When the overall abnormal degree is determined to be larger than threshold value Th (Yes in S16), individual abnormal degree calculator 160 calculates the individual abnormal degree of each constituent element based on the individual normal model and the individual information (S18). Individual abnormal degree calculator 160 calculates the corresponding individual abnormal degrees for all the constituent elements included in manufacturing system 10. After all the individual abnormal degrees have been calculated, decider 170 decides the constituent element corresponding to the maximum individual abnormal degree from the calculated individual abnormal degrees as an abnormal constituent element (S20).

Next, overall abnormal degree calculator 140 generates partial information by deleting the feature amounts of the abnormal constituent element from the overall information (S22). With this, a partial system in which the abnormal constituent element is excluded from manufacturing system 10 is virtually generated. The partial information shows the feature amounts of a whole of the partial system.

Furthermore, overall abnormal degree calculator 140 creates a normal model of the partial system (S24). For example, overall abnormal degree calculator 140 creates a normal model of the partial system by using the same algorithm as the algorithm used for creating the normal model of a whole of manufacturing system 10. Next, overall abnormal degree calculator 140 calculates the partial abnormal degree based on the created normal model of the partial system and the partial information (S26). After the partial abnormal degree is calculated, determiner 150 compares the calculated partial abnormal degree with threshold value Th (S28).

When the partial abnormal degree is determined to be larger than threshold value Th (Yes in S28), the process returns to step S20, and repeats deciding the abnormal constituent element (S20), deleting the abnormal constituent element from the partial system (S22), calculating the partial abnormal degree (S26), and comparing with threshold value Th (S28). These processes are repeated until it is no longer determined that the partial abnormal degree exceeds threshold value Th.

When the partial abnormal degree is determined to be equal to or less than threshold value Th (No in S28), outputter 180 outputs one or more decided abnormal constituent elements as the cause of the abnormality (S30). Specifically, outputter 180 outputs information for specifying one or more decided abnormal constituent elements. After that, the process returns to step S14, and the above processes are repeated.

In this way, in the present embodiment, the calculation of the individual abnormal degree (S18) is performed only when the overall abnormal degree is determined to be larger than threshold value Th (Yes in S16).

FIG. 4 is a diagram showing an example of the overall abnormal degree and the individual abnormal degree calculated by abnormality analysis device 100 according to the present embodiment. Specifically, (a) in FIG. 4 shows the time change of the overall abnormal degree. (b) in FIG. 4 shows the time change of the individual abnormal degree of each of the three constituent elements (here, communications A to C). In each of (a) and (b) in FIG. 4, the horizontal axis represents time and the vertical axis represents the abnormal degree.

As described above, the overall abnormal degree is calculated every predetermined period (for example, one second) within the manufacturing unit (for example, one day) for which the abnormality is analyzed. Thus, as shown in (a) in FIG. 4, the calculating result of the overall abnormal degree is represented as a graph showing the time change of the overall abnormal degree.

In (a) in FIG. 4, the overall abnormal degree exceeds threshold value Th in the period from time t1 to time t2. Thus, as shown in (b) in FIG. 4, the individual abnormal degree is calculated only in the period from time t1 to time t2, and is not calculated in the periods before time t1 and after time t2. In the period from time t1 to time t2, the individual abnormal degree is calculated for all of communication A to communication C.

In this way, the period for calculating the individual abnormal degree is sufficiently reduced, so that the amount of calculation required for abnormality analysis can be reduced.

Figure 5:
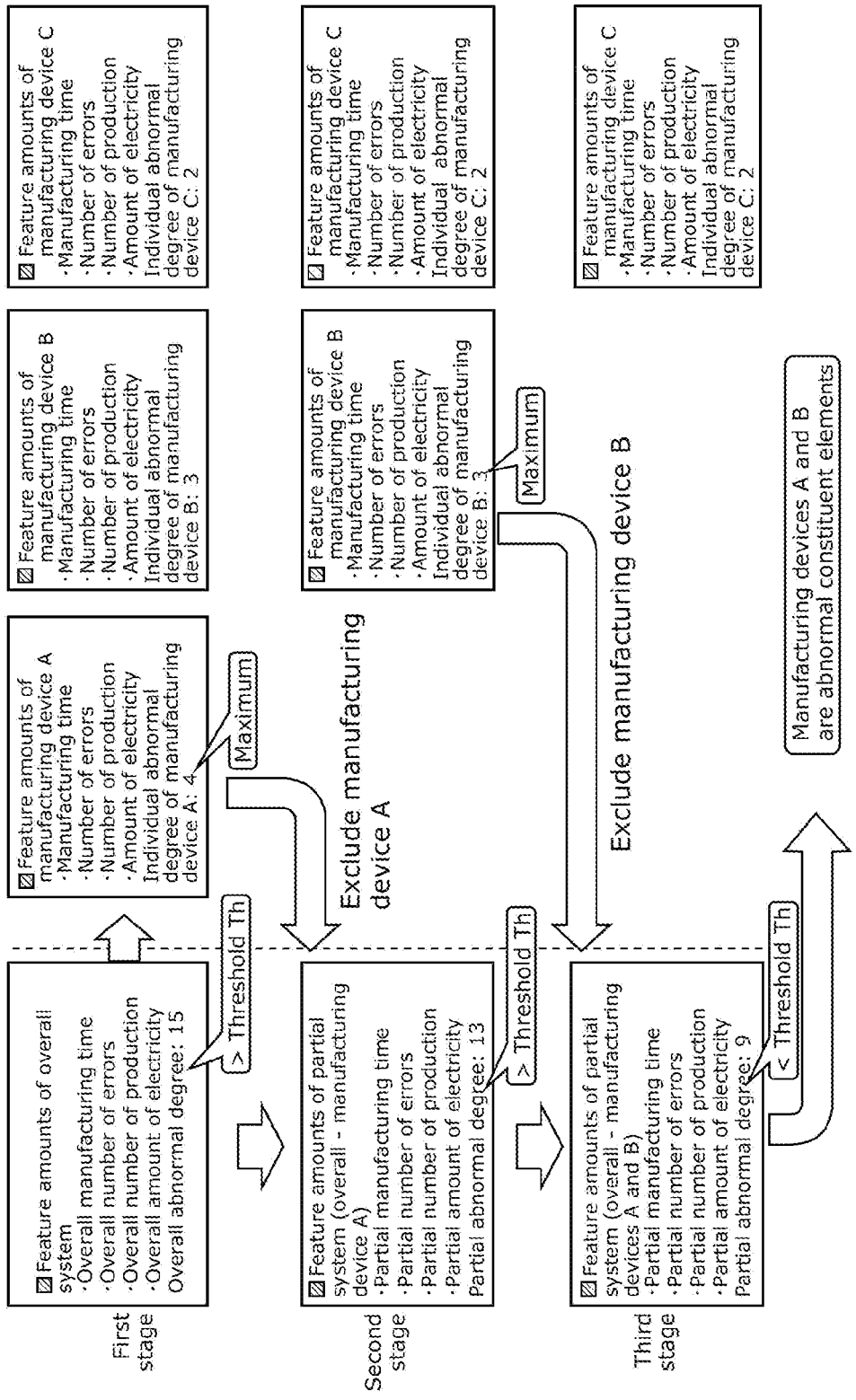
FIG. 5 is a diagram showing a specific example of a process for deciding a manufacturing device in which an abnormality has occurred, which is performed by the abnormality analysis device according to the embodiment.

In the following, a specific example of the process for deciding the abnormal constituent element will be described with reference to FIG. 5 and FIG. 6. FIG. 5 is a diagram showing a specific example of a process for deciding a manufacturing device in which an abnormality has occurred, which is performed by abnormality analysis device 100 according to the present embodiment. FIG. 5 shows a process for a predetermined period (for example, one second), which is a unit for calculating the abnormal degree. In addition, an example is shown in which manufacturing system 10 includes manufacturing devices A to C as constituent elements. Hereinafter, a specific flow of the process will be described with reference to the flowchart shown in FIG. 3.

As shown in FIG. 5, first, as the first step, the overall abnormal degree is calculated based on the feature amounts of a whole of manufacturing system 10 (S14 in FIG. 3). Here, the manufacturing time, the number of errors, the number of production, and the amount of electric power are used as the feature amounts. As a result of the calculation, the overall abnormal degree was calculated to be "15", When threshold value Th is "10", the overall abnormal degree exceeds threshold value Th (Yes in S16), so that the individual abnormal degree of each of manufacturing devices A to C is calculated (S18). Specifically, the corresponding individual abnormal degree is calculated based on a feature amount of each of manufacturing devices A to C. Here, the feature amounts used for calculating the individual abnormal degree are the same as the feature amounts used for calculating the overall abnormal degree. As a result of the calculation, it was calculated that the individual abnormal degree of manufacturing device A was "4", the individual abnormal degree of manufacturing device B was "3", and the individual abnormal degree of manufacturing device C was "2", It should be noted that as is clear from the result, the overall abnormal degree is not necessarily the total value of the individual abnormal degrees.

Manufacturing device A having the maximum individual abnormal degree "4" is decided as an abnormal constituent element from the calculated three individual abnormal degrees, and the feature amounts of manufacturing device A is deleted from the overall information (S20, S22). Here, instead of comparing the three individual abnormal degrees with the threshold value individually, a relative comparison among the three individual abnormal degrees is performed to decide the maximum individual abnormal degree.

Subsequently, as the second step, a normal model of the partial system obtained by excluding manufacturing device A is created (S24), and the partial abnormal degree which is the abnormal degree of a whole of the partial system is calculated based on the feature amounts of the partial system (S26). The feature amounts of the partial system is the manufacturing time, the number of errors, the number of production, and the amount of electricity, similar to the feature amounts used for calculating the overall abnormal degree. For example, the manufacturing time of the partial system is calculated by subtracting the manufacturing time during which manufacturing device A is operating from the overall manufacturing time. Similarly, the number of errors in the partial system is calculated by subtracting the number of errors generated in manufacturing device A from the overall number of errors. Similarly, the number of production in the partial system is calculated by subtracting the number of products produced that are involved in the manufacturing by manufacturing device A from the overall number of production. The amount of electricity of the partial system is calculated by subtracting the amount of electricity consumed by manufacturing device A from the overall amount of electricity. The partial abnormal degree is calculated by statistically processing each of the feature amounts of the partial system calculated in this way. In the example shown in FIG. 5, the partial abnormal degree was calculated to be "13". Since threshold value Th is "10", the partial abnormal degree exceeds threshold value Th (Yes in S28). Therefore, manufacturing device B having the maximum individual abnormal degree "3" among the remaining individual abnormal degrees is decided as an abnormal constituent element, and the feature amounts of manufacturing device B are deleted (S20, S22). It should be noted that since the individual abnormal degree of each of manufacturing devices A to C does not change even if the constituent element is excluded, it is not necessary to calculate it again.

After that, the calculation of the partial abnormal degree and the decision of the abnormal constituent element are repeated until the partial abnormal degree becomes smaller than threshold value Th. Specifically, as the third step, a normal model of the partial system obtained by excluding manufacturing devices A and B is created (S24), and the partial abnormal degree that is an abnormal degree of a whole of the partial system is calculated based on the feature amounts of the partial system (S26), Here, since the partial abnormal degree is calculated as "9" and is smaller than threshold value Th (No in S28), the abnormal constituent element is not decided. That is, manufacturing device C is not decided as an abnormal constituent element.

Since it was determined that the partial abnormal degree is equal to or less than threshold value Th, two of manufacturing devices A and B deleted from a whole of manufacturing system 10 are decided as the abnormal constituent elements.

Subsequently, a specific example different from FIG. 5 will be described with reference to FIG. 6. FIG. 6 is a diagram showing a specific example of processes for deciding communication in which an abnormality has occurred, which is performed by abnormality analysis device 100 according to the present embodiment. FIG. 6 shows processes for a predetermined period (for example, one second), which is a unit for calculating the abnormal degree. In addition, an example is shown in which manufacturing system 10 includes communications A to C as constituent elements. Hereinafter, a specific flow of the processes will be described with reference to the flowchart shown in FIG. 3.

Figure 6:
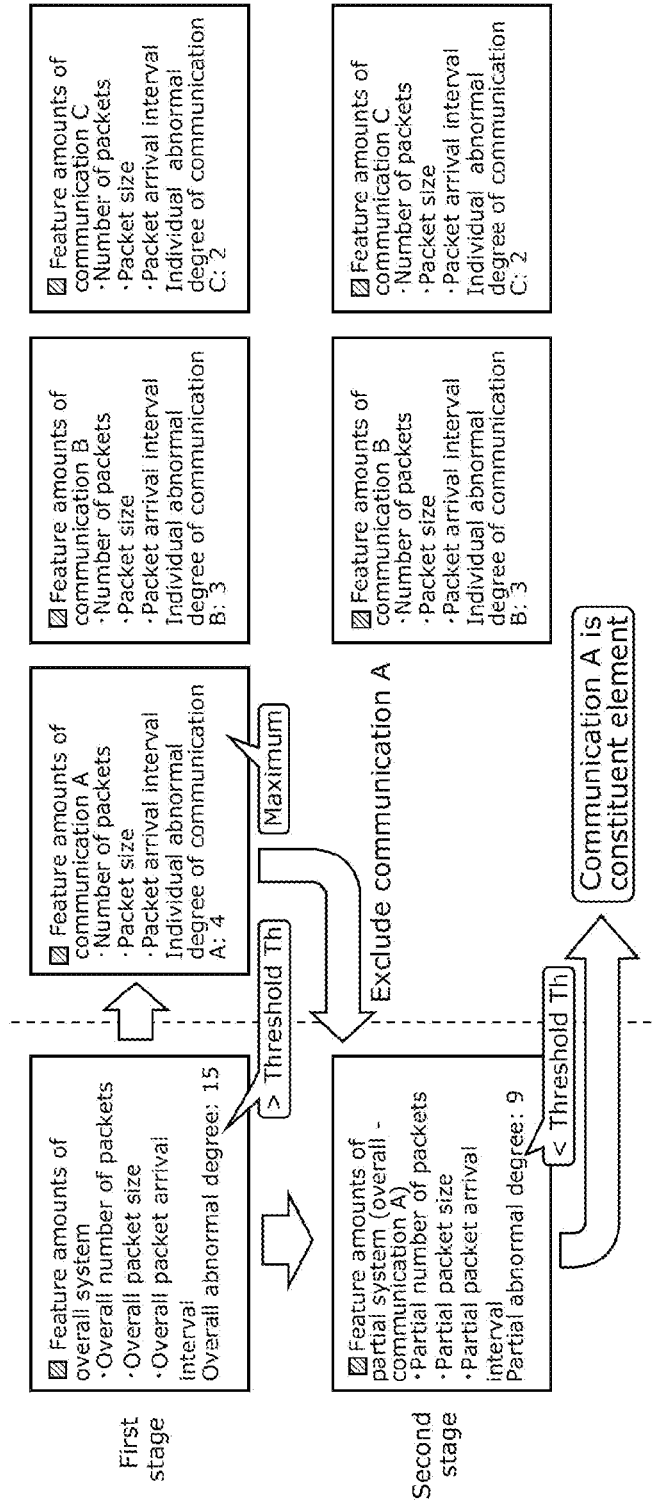
FIG. 6 is a diagram showing a specific example of processing for deciding communication in which an abnormality has occurred, which is performed by the abnormality analysis device according to the embodiment.

As shown in FIG. 6, first, the overall abnormal degree is calculated based on the feature amounts of a whole of manufacturing system 10 (S14 in FIG. 3), Here, the number of packets, the maximum size of packets, and the maximum value of the packet arrival intervals are used as the feature amounts. As a result of the calculation, the overall abnormal degree was calculated to be "15". When threshold value Th is "10", the overall abnormal degree exceeds threshold value Th (Yes in S16), so that the individual abnormal degree of each of communications A to C is calculated (S18), Specifically, the corresponding individual abnormal degree is calculated based on each of the feature amounts of communications A to C. Here, the feature amounts used for calculating the individual abnormal degree is the same as the feature amounts used for calculating the overall abnormal degree. As a result of the calculation, the individual abnormal degree of communication A was calculated as "4", the individual abnormal degree of communication B was "3", and the individual abnormal degree of communication C was calculated as "2".

Communication A having the maximum individual abnormal degree "4" is decided as an abnormal constituent element among the calculated three individual abnormal degrees, and the feature amounts of communication A are deleted from the overall information (S20, S22). Here, instead of comparing the three individual abnormal degrees with the threshold value individually, a relative comparison among the three individual abnormal degrees is performed to decide the maximum individual abnormal degree.

Subsequently, a normal model of the partial system obtained by excluding communication A is created (S24), and the partial abnormal degree, which is an abnormal degree of a whole of the partial system, is calculated based on the feature amounts of the partial system (S26). The feature amounts of the partial system is the number of packets, the maximum size of the packets, and the maximum value of the packet arrival intervals, similar to the feature amounts used for calculating the overall abnormal degree. For example, the number of packets of the partial system is calculated by subtracting the number of packets of communication A from the overall number of packets. Similarly, the maximum size of the packets of the partial system and the maximum value of the arrival intervals are calculated for the remaining packets obtained by excluding the packet of communication A from the overall packets. The partial abnormal degree is calculated by statistically processing each of the feature amounts of the partial system calculated in this way. In the example shown in FIG. 6, the partial abnormal degree was calculated to be "9". Since the partial abnormal degree is smaller than threshold value Th (No in S28), the abnormal constituent element is not decided. That is, neither remaining communication B nor communication C is determined as an abnormal constituent element.

Since it was determined that the partial abnormal degree is equal to or less than threshold value Th, communication A deleted from a whole of manufacturing system 10 is decided as the abnormal constituent element.

As described above, in the present embodiment, when the overall abnormal degree exceeds threshold value Th, an abnormality has occurred in at least one of the plurality of constituent elements, so that the constituent element corresponding to the maximum individual abnormal degree the maximum among the plurality of constituent elements is decided as the abnormal constituent element. Furthermore, by repeating the same process for the partial system obtained by excluding the abnormal constituent element from the system, it is possible to decide a plurality of abnormal constituent elements even when the plurality of abnormal constituent elements exist. In addition, when only one abnormal constituent element is included in the plurality of constituent elements, the abnormal constituent element is excluded first, so that the partial abnormal degree of the partial system becomes smaller than threshold value Th. With this, only one abnormal constituent element is decided.

Other Embodiments

Although the abnormality analysis device, the abnormality analysis method, the manufacturing system, and the like according to one or more aspects have been described above based on the embodiments, the present disclosure is not limited to these embodiments. A form obtained by applying various variations that a person skilled in the art can conceive to the embodiments, and a form realized by combining the constituent elements in different embodiments without departing from the spirit of the present disclosure are also included in this disclosure.

For example, the communication method between the devices described in the above embodiment is not particularly limited. When wireless communication is performed between devices, the wireless communication method (communication standard) is, for example, short-range wireless communication such as ZigBee (registered trademark), Bluetooth (registered trademark), or wireless LAN (Local Area Network). Alternatively, the wireless communication method (communication standard) may be communication via a wide area communication network such as the Internet. In addition, wired communication may be performed between the devices instead of wireless communication. Specifically, the wired communication is a power line communication (PLC) or a communication using a wired LAN.

In addition, in the above embodiment, another processor may execute the process executed by the specific processor. In addition, the order of the plurality of processes may be changed, or the plurality of processes may be executed in parallel. In addition, the distribution of the constituent elements included in the manufacturing system to a plurality of devices is an example. For example, the constituent elements of one device may be included in another device. In addition, the manufacturing system may be realized as a single device.

For example, the processes described in the above embodiment may be realized by centralized processing using a single device (system), or may be realized by distributed processing using a plurality of devices. In addition, the number of processors that execute the above program may be singular or plural. That is, centralized processing may be performed, or distributed processing may be performed.

In addition, in the above embodiment, all or a part of the constituent elements such as the controller may be configured by a dedicated hardware, or may be realized by executing a software program suitable for each constituent element. Each constituent element may be realized by a program executer such as a CPU (Central Processor) or a processor reading and executing a software program recorded on a recording medium such as an HDD (Hard Disk Drive) or a semiconductor memory.

In addition, a constituent element such as a controller may include one or more of electronic circuits. The one or more electronic circuits may be general-purpose circuits or dedicated circuits, respectively.

One or more electronic circuits may include, for example, a semiconductor device, an IC (Integrated Circuit), an LSI (Large Scale Integration), or the like. The IC or LSI may be integrated on one chip or may be integrated on a plurality of chips. Here, it is called IC or LSI, but the name changes depending on the degree of integration, and it may be called system LSI, VLSI (Very Large Scale Integration), or ULSI (Ultra Large Scale Integration). In addition, an FPGA (Field Programmable Gate Array) programmed after the LSI is manufactured can also be used for the same purpose.

In addition, the general or specific aspects of the present disclosure may be realized by a system, a device, a method, an integrated circuit or a computer program. Alternatively, it may be realized by a computer-readable non-transitory recording medium such as an optical disk, HDD or semiconductor memory in which the computer program is stored. In addition, it may be realized by any combination of a system, a device, a method, an integrated circuit, a computer program and a recording medium.

In addition, in each of the above embodiments, various changes, replacements, additions, omissions, and the like can be made within the scope of the claims or the equivalents thereof.

INDUSTRIAL APPLICABILITY

The present disclosure can be used as an abnormality analysis device or the like capable of accurately detecting an abnormality in a manufacturing system with a small amount of calculation, and can be used, for example, as a management device or the like of a manufacturing system.

The invention claimed is:

1. An abnormality analysis device that analyzes an abnormality in a manufacturing system that manufactures products by operating a plurality of constituent elements, the abnormality analysis device comprising:
    an overall information obtainer that obtains overall information indicating an overall feature amount of the manufacturing system;
    an overall abnormal degree calculator that calculates an overall abnormal degree that is an abnormal degree of a whole of the manufacturing system by statistically processing the overall information;
    an individual information obtainer that obtains individual information indicating a feature amount of each of the plurality of constituent elements;
    an individual abnormal degree calculator that calculates an individual abnormal degree that is an abnormal degree of each of the plurality of constituent elements by statistically processing the individual information;
    a determiner that determines whether the overall abnormal degree exceeds a first threshold value; and
    a decider that decides an abnormal constituent element among the plurality of constituent elements, based on a plurality of individual abnormal degrees each being the individual abnormal degree calculated by the individual abnormal degree calculator, wherein
    the individual abnormal degree calculator calculates the individual abnormal degree when the determiner determines that the overall abnormal degree exceeds the first threshold value,
    the overall abnormal degree calculator further calculates a partial abnormal degree by statistically processing partial information obtained by excluding feature amounts of the abnormal constituent element from the overall information, the partial abnormal degree being an abnormal degree of a partial system obtained by excluding the abnormal constituent element from the manufacturing system, when the overall abnormal degree is determined to exceed the first threshold value, and
    the determiner further determines whether the partial abnormal degree exceeds a second threshold value.

2. The abnormality analysis device according to claim 1, wherein:
    the decider decides, as the abnormal constituent element, a constituent element corresponding to a maximum individual abnormal degree among the plurality of individual abnormal degrees calculated by the individual abnormal degree calculator.

3. The abnormality analysis device according to claim 2, wherein
    the decider further decides, as the abnormal constituent element, a constituent element corresponding to the maximum individual abnormal degree among remaining individual abnormal degrees obtained by excluding an individual abnormal degree corresponding to the abnormal constituent element from the plurality of abnormal degrees, when the partial abnormal degree is determined to exceed the second threshold value.

4. The abnormality analysis device according to claim 3, wherein
    the overall abnormal degree calculator and the determiner repeat a calculation of the partial abnormal degree and a decision of the abnormal constituent element until the determiner does not determine that the partial abnormal degree exceeds the second threshold value.

5. The abnormality analysis device according to claim 2, further comprising:
an outputter that outputs information for specifying the abnormal constituent element.

6. The abnormality analysis device according to claim 1, wherein
the overall abnormal degree calculator calculates the overall abnormal degree every predetermined period,
the determiner determines whether the overall abnormal degree calculated in the every predetermined period exceeds the first threshold value, and
the individual abnormal degree calculator calculates the individual abnormal degree only in a period when the determiner determines that the overall abnormal degree exceeds the first threshold value, and does not calculate the individual abnormal degree in a period when the determiner does not determine that the overall abnormal degree exceeds the first threshold value.

7. The abnormality analysis device according to claim 1, wherein the manufacturing system includes:
one or more manufacturing devices that manufacture the products; and
a control device that communicates with and controls the one or more manufacturing devices, and
one of the plurality of constituent elements is communication between one of the one or more manufacturing devices and the control device.

8. The abnormality analysis device according to claim 1, wherein
the manufacturing system includes one or more manufacturing devices that manufacture the products, and
at least one of the plurality of constituent elements is the one or more manufacturing devices.

9. A manufacturing system that manufactures products by operating a plurality of constituent elements, the manufacturing system comprising:
the abnormality analysis device according to claim 1.

10. An abnormality analysis method that analyzes abnormality in a manufacturing system that manufactures products by operating a plurality of constituent elements, the abnormality analysis method comprising:
obtaining overall information indicating an overall feature amount of the manufacturing system;
calculating an overall abnormal degree that is an abnormal degree of a whole of the manufacturing system by statistically processing the overall information;
obtaining individual information indicating a feature amount of each of the plurality of constituent elements;
calculating, for each of the plurality of constituent elements, an individual abnormal degree that is an abnormal degree of the constituent element, by statistically processing the individual information;
determining whether the overall abnormality level exceeds a first threshold value; and
deciding an abnormal constituent element among the plurality of constituent element, based on a plurality of individual abnormal degrees each being the individual abnormal degree calculated, wherein
in the calculating of the individual abnormal degree, the individual abnormal degree is calculated when the overall abnormality level is determined to exceed the first threshold value,
in the calculating of the overall abnormal degree, a partial abnormal degree is further calculated by statistically processing partial information obtained by excluding feature amounts of the abnormal constituent element from the overall information, the partial abnormal degree being an abnormal degree of a partial system obtained by excluding the abnormal constituent element from the manufacturing system, when the overall abnormal degree is determined to exceed the first threshold value, and
in the determining, it is further determined whether the partial abnormal degree exceeds a second threshold value.

11. A non-transitory computer-readable recording medium having recorded thereon a program for causing a computer to execute the abnormality analysis method according to claim 10.

* * * * *